following the general procedure of Example I. Thus, using the ruthenium chelate of acetylacetone or rhodium dicarbonyl chloride as the catalysts one obtains similar results.

3,097,237
PROCESS FOR PREPARING CARBOXYLIC ACID HALIDES

John Carl Sauer, Wilmington, Del., assignor to E. I. du Pont de Nemours and Company, Wilmington, Del., a corporation of Delaware
No Drawing. Filed Feb. 23, 1960, Ser. No. 10,103
7 Claims. (Cl. 260—544)

This invention relates to a new method for synthesizing acyl halides.

The conventional methods for preparing acyl halides involve reaction of inorganic halides with an acid, salt or anhydride, chlorination of aldehydes, etc. Because of the importance of the acyl halides as chemical intermediates, there is a continuing technical interest in finding new and improved methods for their preparation.

According to this invention acyl halides are obtained by reacting acetylene, carbon monoxide and a hydrogen halide (fluoride, chloride or bromide) in the presence of a catalytic amount of a rhodium or ruthenium carbonyl, chelate of acetylacetone, or halide in which the halogens are of atomic number 17–53.

In practice, a pressure reactor is charged with the catalyst, the reactor is closed, cooled to 0° C. or lower, and evacuated. A predetermined amount of acetylene is then added, followed by hydrogen halide. The charged reactor is placed in a shaker box and carbon monoxide is introduced to provide at least one mole thereof per mole of acetylene and the charge is agitated and heated at a temperature of 50° to 250° C. until there is no further reaction, as evidenced by cessation of pressure drop. Throughout the reaction period the pressure within the reactor is maintained by injection of fresh carbon monoxide. After reaction is complete, the reactor is allowed to cool, unreacted gases are vented to the atmosphere, and the reactor discharged. The desired acyl halide is separated from the reaction mixture by distillation or other method known to those skilled in the art.

The examples which follow illustrate but do not limit this invention. The rhodium and ruthenium halides used are the commercially available products and the reactor used corresponding to a capacity of 400 ml. of water.

Example I

A silver-lined pressure reactor was charged with 0.5 g. of rhodium trichloride trihydrate. The reactor was sealed, evacuated, and 26 g. of acetylene, followed by 36.5 g. of hydrogen chloride was then added. The reactor was connected to a source of carbon monoxide and, with shaking, carbon monoxide was injected so that at 125° to 131° C. a pressure of 675–920 atm. developed. These conditions were maintained during 6 hours, with periodic injections of fresh carbon monoxide. A total pressure drop of about 210 atm. was observed. The reactor was allowed to cool to room temperature, unreacted gases bled through a vent, and the liquid contents discharged into a bottle. Distillation gave 10 g. of acrylyl chloride, B.P. 70–80° C. (almost entirely at 74–9° C.). The anilide made by adding aniline to acrylyl chloride melted at 103° C., after crystallization from methanol. (Shriner, Fusion, and Curtin, "The Systematic Identification of Organic Compounds," 4th edition, 1956, page 276, gives the melting point of acrylyl anilide as 104° C.) The infrared spectrum of the product was consistent with the proposed acrylyl chloride structure.

The above experiment was repeated, using the procedure and amounts indicated, employing a pressure range of 770–975 atm. during 4 hours at 130° C. The pressure drop was 220 atm. and 11 g. of acrylyl chloride, 69–79° C. (mostly distilled at 76–8° C.) was isolated.

Other catalysts may be used to obtain acyl halides by following the general procedure of Example I. Thus, using the ruthenium chelate of acetylacetone or rhodium dicarbonyl chloride as the catalysts one obtains similar results.

Example II

In the reactor of Example I there was placed 0.5 g. of ruthenium trichloride, 20 g. of anhydrous hydrogen fluoride, and 26 g. of acetylene. A pressure of 860–960 atm. was maintained by carbon monoxide injection during 12 hours at a reaction temperature of 198–200° C. After bleeding down the excess gas, about 2 g. of a liquid was poured from the reactor. This liquid fumed in air and had a lachrymatory odor, resembling that of acrylyl fluoride. The acrylyl fluoride slowly hydrolyzed to acrylic acid upon standing.

Example III

Using the same reactants and amounts described in Example I, a carbon monoxide pressure of 575–670 atm. was maintained during 8 hours at 110° C. The total pressure drop amounted to 125 atm. The reaction mixture consisted of a slushy liquid from which there was obtained 1.5 g. of acrylyl chloride, B.P. 77–81° C. The infrared spectrum was compatible with that of acrylyl chloride.

Example IV

The reactor of Example I was charged with 0.5 g. of rhodium trichloride trihydrate and 50 ml. of methylene chloride. After closing, cooling to −80° C., and evacuating, there was added 26 g. of acetylene and 36.5 g. of hydrogen chloride. By carbon monoxide injection a pressure of 660–1000 atm. was maintained during 15 hours at 138–143° C. The total pressure drop during this period amounted to 370 atm. By distillation there was isolated 19 g. of product, B.P. 71–95° C. (nearly all distilled at 77°) whose infrared spectrum conformed essentially to pure acrylyl chloride. In addition, the methylene chloride, B.P. 40–2° C., also contained appreciable quantities of acrylyl chloride based on the formation of precipitate when aniline was added.

In using rhodium acetylacetonate or diruthenium noncarbonyl as catalysts in the general procedure of Example IV, one obtains similar results.

Example V

The reactor of Example I was charged with 0.4 g. rhodium trichloride trihydrate, 100 ml. of methylcyclohexane, 26 g. of acetylene, and 36.5 g. of hydrogen chloride. By carbon monoxide injection a pressure of 740–1000 atm. was maintained during 6 hours at 157–163° C. Distillation of the reaction product gave a total of 41 g. of a distillate, B.P. 97–100° C. The infrared analysis indicated the presence of acrylyl chloride in methylcyclohexane.

Example VI

The reactor of Example I was charged with 0.4 g. of rhodium trichloride trihydrate, 200 ml. of toluene, 26 g. of acetylene, and 36.5 g. of hydrogen chloride. Carbon monoxide was then injected so that at 128 to 130° C. the pressure was 550–900 atm. These conditions were maintained during 9 hours. Distillation of the reaction mixture gave 3 g. of crude acrylyl chloride, the presence of which was confirmed by infrared analysis and the conversion to the anilide, which melted at 104° C. after recrystallization from methanol. A 10 g. fraction of β-chloropropionyl chloride, B.P. 55° C./29 mm., was also isolated by distillation. The spectrum of this material was identical to that of authentic β-chloropropionyl chloride. The residue from this distillation was allowed to stand in the air for two days. The crystalline mass, after recrystallization from water, was found to be succinic acid, by comparison with the infrared spectrum of an authentic sample of succinic acid. The succinic acid was formed by hydrolysis of the succinoyl chloride originally formed in the reaction.

As illustrated by the detailed examples, the use of a reaction medium is not necessary. When a reaction medium is employed, it must be one which is unreactive with the hydrogen halide. Suitable media are the aromatic, aliphatic and cycloaliphatic hydrocarbons, e.g., benzene, toluene, cyclohexane, methylcyclohexane, isobutane, hexane, and the like, alkane halides, e.g., methylene chloride, carbon tetrachloride, and the like.

The amount of reaction medium is not critical and generally it equals or exceeds by 10 or more fold the combined weights of the acetylene and hydrogen halide.

The relative proportions of the reactants employed in the process may vary over wide ranges. Thus, while the ratio of acetylene to hydrogen halide may vary from 10 to 1 or greater to 1 to 10 or even less, a substantially equimolar ratio is preferred for economic reasons. Carbon monoxide however, is ordinarily employed in amounts equal to or greater than acetylene on a molar basis. Generally it provides the desired reaction pressure. In the production of acrylyl chloride the acetylene, hydrogen chloride and carbon monoxide react in a 1:1:1 molar ratio.

The process is carried out at a temperature of at least 50° C. Usually, however, a temperature in the range of 80° to 250° C. is employed because within this range the best results are obtained from the standpoint of product yield and rate of reaction.

As a rule the reaction is carried on until there is no further pressure drop. Throughout the period of reaction the pressure within the reactor is maintained by periodic injections of carbon monoxide at between about 50 and 3000 atmospheres, preferably 700 to 1500 atmospheres at the reaction temperature.

The reaction is conducted in the presence of a catalytic amount of a rhodium or ruthenium carbonyl, chelate of acetylacetone, or halide in which the halogens are of atomic number 17–53. The amount of catalyst employed is usually from 1 to 15% by weight of the acetylene charged into the reactor.

In the process of this invention any hydrogen halide in which the halogen has an atomic number of 9 to 35 can be used. Examples are hydrogen fluoride, hydrogen chloride and hydrogen bromide.

Illustrative halides, chelates and carbonyls of ruthenium and rhodium useful for the present invention are ruthenium dichloride, trichloride, and tetrachloride, ruthenium triiodide, rhodium trichloride, and tetrachloride, diruthenium nonacarbonyl, monoruthenium pentacarbonyl, rhodium tetracarbonyl, [Rh(CO)$_4$]$_2$ and [Rh(CO)$_4$]$_x$, rhodium tetracarbonyl hydride, rhodium dicarbonyl chloride, rhodium (III) acetylacetonate, bis(2-pyridine aldehyde) rhodium (III) chloride, and the like. The preferred halides are the chlorides and bromides, which of course may be used in hydrate form.

Commercial acetylene containing less than 20 p.p.m. of oxygen and treated with alumina and caustic pellets to remove impurities such as acetone, water, or phosphines is suitable.

The process of this invention is an improvement over previously known methods for synthesizing acyl halides in that it is a one-step operation which employs cheap, abundantly available acetylene, carbon monoxide, and hydrogen halides as precursors. The process yields no by-products which require disposal and hence is economical.

What is claimed is:

1. A method of preparing acrylyl halides, β-halopropionyl halides, and succinoyl halides which comprises reacting acetylene, carbon monoxide, and a hydrogen halide in which the halogen is of atomic number 9–35 at a temperature of 50° to 250° C. and a pressure between 50 and 3000 atmospheres in the presence of a catalytic amount of a compound of the group consisting of rhodium and ruthenium carbonyls, chelates of acetylacetone, and halides in which the halogens are of atomic number 17–53.

2. A method of claim 1 wherein said compound is ruthenium trichloride.

3. A method of claim 1 wherein said compound is rhodium trichloride trihydrate.

4. A method of claim 1 conducted at a temperature between about 80 and 250° C. and a pressure of between about 700 and 1500 atmospheres.

5. A method for preparing acrylyl chloride which comprises contacting acetylene, carbon monoxide and hydrogen chloride with a catalytic amount of ruthenium trichloride at a temperature of 50° to 250° C. and a pressure of between about 50 and 3000 atmospheres.

6. A method for preparing acrylyl chloride, β-chloropropionyl chloride, and succinoyl chloride which comprises contacting acetylene, carbon monoxide and hydrogen chloride with a catalytic amount of rhodium trichloride trihydrate at a temperature of 50° to 250° C. and a pressure of between about 50 and 3000 atmospheres.

7. A method of preparing acrylyl fluoride comprising contacting acetylene, carbon monoxide and hydrogen fluoride with a catalytic amount of ruthenium trichloride at a temperature of 50° to 250° C. and a pressure between about 50 and 3000 atmospheres.

References Cited in the file of this patent

UNITED STATES PATENTS 2,845,451     Lautenschlager _____ July 29, 1958

FOREIGN PATENTS 854,948     Germany _____ Nov. 10, 1952

OTHER REFERENCES

Copenhaver et al., "Acetylene and Carbon Monoxide Chemistry," pp. 247–249 (1949).